United States Patent
Luo et al.

(10) Patent No.: US 12,405,145 B1
(45) Date of Patent: Sep. 2, 2025

(54) MICRO FLOW MEASURING DEVICE AND METHOD BASED ON MASS METHOD

(71) Applicants: National Institute of Measurement and Testing Technology, Chengdu (CN); Division of Flow Metrology, National Institute of Measurement and Testing Technology, Chengdu (CN)

(72) Inventors: Fan Luo, Chengdu (CN); Rong Gan, Chengdu (CN); Jie Zhou, Chengdu (CN); Li Lei, Chengdu (CN); Shihui Cheng, Chengdu (CN)

(73) Assignees: National Institute of Measurement and Testing Technology, Chengdu (CN); Division of Flow Metrology, National Institute of Measurement and Testing Technology, Chengdu (CN)

( * ) Notice: Subject to any disclaimer, the term of this patent is extended or adjusted under 35 U.S.C. 154(b) by 0 days.

(21) Appl. No.: 19/010,684

(22) Filed: Jan. 6, 2025

Related U.S. Application Data

(63) Continuation of application No. PCT/CN2024/101088, filed on Jun. 24, 2024.

(30) Foreign Application Priority Data

May 16, 2024 (CN) .......................... 202410608739.4

(51) Int. Cl.
  *G01F 1/78* (2006.01)
  *G01F 15/00* (2006.01)
  *G01F 15/18* (2006.01)

(52) U.S. Cl.
  CPC .............. *G01F 1/78* (2013.01); *G01F 15/006* (2013.01); *G01F 15/185* (2013.01)

(58) Field of Classification Search
  CPC ........ G01F 1/78; G01F 15/006; G01F 15/185; G01F 1/372; G01F 1/7086;
  (Continued)

(56) References Cited

U.S. PATENT DOCUMENTS

2016/0232997 A1* 8/2016 Kim .......................... G21D 1/00
2017/0052056 A1* 2/2017 Yamasaki ............... G01F 25/14

FOREIGN PATENT DOCUMENTS

CN    206430773 U  *  8/2017
CN    108534857 A     9/2018
(Continued)

*Primary Examiner* — Brandi N Hopkins
(74) *Attorney, Agent, or Firm* — Nitin Kaushik

(57) ABSTRACT

The present invention discloses a micro flow measuring device and method based on a mass method. The measuring device includes: an inner anti-evaporation cover; an outer anti-evaporation assembly; a weighing balance; a liquid collecting container; a packing assembly, disposed in the liquid collecting container, where the packing assembly is made of a material with low water absorption and can be gas-permeable, and an accommodating cavity configured to accommodate to-be-measured liquid is formed between a lower end of the packing assembly and a bottom portion of the liquid collecting container; a capillary receiving tube, where an upper end and a lower end of the capillary receiving tube are provided with a liquid receiving opening and a liquid discharging opening respectively, the lower end of the capillary receiving tube passes through the packing assembly vertically and extends into the accommodating cavity.

15 Claims, 5 Drawing Sheets

(58) Field of Classification Search
CPC .............. B01L 3/50273; G01N 21/76; G01N 15/1023; G01N 21/031; G01N 15/0266; G01N 27/447; G01N 33/50; G01N 33/52; G01N 27/44791; G01N 21/01; G01N 33/5302; G01N 33/54326; G01N 15/06; G01N 29/0681; G01N 21/553; C12Q 1/686; G01M 3/3281; G01D 21/02
USPC ............................................ 73/861; 702/100
See application file for complete search history.

(56) References Cited

FOREIGN PATENT DOCUMENTS

| | | |
|---|---|---|
| CN | 115077643 A | 9/2022 |
| CN | 116104751 A | 5/2023 |

* cited by examiner

MICRO FLOW MEASURING DEVICE AND METHOD BASED ON MASS METHOD

CROSS-REFERENCE TO RELATED APPLICATIONS

The application claims priority to Chinese patent application No. 2024106087394, filed on May 16, 2024, the entire contents of which are incorporated herein by reference.

TECHNICAL FIELD

The present invention relates to the technical field of flow measuring, and specifically, to a micro flow measuring device and method based on a mass method.

BACKGROUND

An existing micro flow measuring technology basically adopts a mass method. Liquid whose flow is to be measured is injected into a container, and then an accumulated flow is weighed in a timed manner to obtain an average flow error. According to a liquid collection form, a liquid outlet needle can be submerged in or suspended on a liquid surface in a collecting container. A collection form of the liquid submerged in the liquid surface can also be divided into whether the liquid surface is covered with an oil film.

In actual application, these collection forms have various advantages and disadvantages: for a situation where the needle is submerged in the liquid surface, although the accumulation of liquid in the needle is eliminated, since additional force generated by surface tension formed between the needle and the liquid surface in the container is applied to a balance, liquid discharging pressure of the needle and the surface tension will constantly change as the liquid is continuously injected into the container to enable the liquid surface to continue to rise, resulting in a measuring error. If the liquid surface is covered with the oil film, the error will further increase.

Another improvement method is that the needle is suspended vertically on a capillary tube on the collecting container to form a continuous liquid column with an extremely small height, and the liquid is guided to continuously flow downwards to maintain a constant liquid surface height at the same time, thereby avoiding the influence of a change in the liquid surface height on the surface tension. However, the liquid column still creates force between the needle and the container. If there is a slight change in a flow, a change in a shape of the liquid column will change the additional force, resulting in an error. According to the two main micro liquid flow measuring manners described above, due to continuous liquid injection and the surface tension, the weighing balance cannot obtain a stable reading, and therefore can only dynamically read an instantaneous value, resulting in a relatively large measuring error.

If the needle is placed on the liquid surface to form liquid droplets that naturally drip into the container, although sufficient reading time is given to the weighing balance between the liquid droplets, there are still problems such as nonlinear evaporation, droplet impact, and inconsistent residual liquid of the needle at beginning and end time during a liquid droplet formation process, resulting in a larger measuring error.

In addition, for an open-type collecting container, if a liquid surface in the open-type collecting container is not covered with the oil film, a large amount of evaporation will be generated, which will affect a measuring result.

SUMMARY

A main purpose of the present invention is to provide a micro flow measuring device and method based on a mass method, to solve a problem that there is still a relatively large measuring error in micro flow measuring in the related art.

To implement the above purpose, the present invention provides a micro flow measuring device based on a mass method, and the measuring device includes:
  an inner anti-evaporation cover;
  an outer anti-evaporation assembly, where the outer anti-evaporation assembly covers the inner anti-evaporation cover;
  a weighing balance, disposed in the inner anti-evaporation cover;
  a liquid collecting container, disposed in the inner anti-evaporation cover and placed on the weighing balance;
  a packing assembly, disposed in the liquid collecting container, where the packing assembly is made of a material with low water absorption and can be gas-permeable, and an accommodating cavity configured to accommodate to-be-measured liquid is formed between a lower end of the packing assembly and a bottom portion of the liquid collecting container;
  a capillary receiving tube, where the capillary receiving tube is disposed in an L shape, an upper end and a lower end of the capillary receiving tube are provided with a liquid receiving opening and a liquid discharging opening respectively, the lower end of the capillary receiving tube passes through the packing assembly vertically and extends into the accommodating cavity, and the upper end of the capillary receiving tube passes through the inner anti-evaporation cover and is bent to be horizontal; and
  a liquid outlet tube, where the liquid outlet tube includes a horizontal liquid outlet section, an end portion of the horizontal liquid outlet section is provided with a liquid outlet, the liquid outlet of the liquid outlet tube is horizontally aligned with and maintains a first distance with the liquid receiving opening after passing through the outer anti-evaporation assembly, to enable liquid discharged by the liquid outlet to be sucked into the liquid receiving opening at intervals, and the liquid discharging opening drips the liquid into the liquid collecting container at intervals.

Further, the first distance is less than an outer diameter of the liquid outlet and is greater than a maximum distance required for forming a continuous liquid column between the liquid outlet and the liquid receiving opening.

Further, the first distance is less than one-half of the outer diameter of the liquid outlet.

Further, one end, close to the capillary receiving tube, on the horizontal liquid outlet section of the liquid outlet tube is provided with a tapered structure, and an outer diameter of one end, close to the capillary receiving tube, on the tapered structure is equal to an inner diameter of the liquid receiving opening; and
  the first distance is a distance between the end, close to the capillary receiving tube, on the tapered structure and an end portion of the liquid receiving opening.

Further, the capillary receiving tube includes a first tube section and a second tube section that are communicated with each other, an inner diameter of the second tube section is greater than an inner diameter of the first tube section, the second tube section passes through the packing assembly vertically and extends into the accommodating cavity, and the liquid discharging opening is located at a lower end of the second tube section; and the first tube section includes a horizontal section, and the liquid receiving opening is located on an end portion of the horizontal section.

Further, the first tube section further includes a corner section, an inner surface of the corner section is disposed in an arc-shaped surface, and a corner radius of the corner section is from 1D to 2D, where D is an outer diameter of the first tube section.

Further, the first tube section is disposed in a cylindrical shape.

Further, the first tube section is connected to the second tube section through a transition section, the transition section is disposed in a tapered shape, a small-diameter end of the transition section is connected to the first tube section, and a large-diameter end of the transition section is connected to the second tube section.

Further, an angle between a generatrix of the transition section and an axis of the transition section is from 10° to 15°.

Further, the packing assembly is made of one or more microporous high polymer materials of polyamide, polyethylene, and polypropylene.

Optionally, the packing assembly includes a sealing packing and a gas discharging tube, the sealing packing is made of the material with the low water absorption, and the gas discharging tube penetrates through the sealing packing for gas permeation.

Further, an inner diameter of the gas discharging tube is less than an inner diameter of the liquid outlet tube.

Further, a distance between the liquid discharging opening and an inner bottom surface of the liquid collecting container is greater than a liquid height in the accommodating cavity in a measuring process.

Further, the sealing packing is elastic, and the sealing packing is stuffed in and fixed to the liquid collecting container; and the sealing packing is provided with a penetrating hole and a mounting hole, the capillary receiving tube passes through and is closely matched with the penetrating hole, and the gas discharging tube passes through and is closely matched with the mounting hole.

Further, a plurality of mounting holes are provided, at least one mounting hole is provided with the gas discharging tube, and other mounting holes are provided with a detachable sealing plug respectively.

Further, the sealing plug is made of the material with the low water absorption, and a lower end surface of the sealing plug is flush with a lower end surface of the sealing packing.

Further, the outer anti-evaporation assembly includes an outer anti-wind cover and an outer anti-evaporation cover, the outer anti-evaporation cover is disposed on a top portion of the inner anti-evaporation cover, and the outer anti-wind cover covers outer sides of the outer anti-evaporation cover and the inner anti-evaporation cover;

the upper end of the capillary receiving tube extends into the outer anti-evaporation cover, and the liquid outlet of the liquid outlet tube is horizontally aligned with the liquid receiving opening after passing through the outer anti-wind cover and the outer anti-evaporation cover in sequence; and a first humidity adjusting structure is disposed in the outer anti-evaporation cover, and the first humidity adjusting structure increases humidity in the outer anti-evaporation cover.

Further, the micro flow measuring device further includes an evaporation well, the evaporation well is disposed in the inner anti-evaporation cover, an inner side of the evaporation well is provided with a mounting chamber penetrating axially, the mounting chamber is sleeved on outer sides of the liquid collecting container and the weighing balance, and there is a radial gap between the mounting chamber and the liquid collecting container and the weighing balance; and a second humidity adjusting structure is disposed on the evaporation well, and the second humidity adjusting structure is configured to increase humidity in the mounting chamber.

According to another aspect of the present invention, a micro flow measuring method is provided, adopts the above micro flow measuring device, and includes the following steps:

extruding liquid whose flow is measured from the liquid outlet of the liquid outlet tube, to form a micro-convex liquid surface;

sucking the liquid extruded by the liquid outlet at an interval of $T_1$ time by using the liquid receiving opening of the capillary receiving tube;

reading a reading of the weighing balance within each interval of $T_1$ time after the liquid is sucked by the liquid receiving opening of the capillary receiving tube for the first time; and determining the flow of the liquid based on the reading of the weighing balance within each $T_1$ time.

In the embodiments of the present invention, first, the liquid outlet tube and the capillary receiving tube are horizontally aligned, so that a continuous liquid flow is converted into suction that is at equal time intervals, to provide stable reading time for the weighing balance, thereby improving repeatability and accuracy of flow measuring.

Then, the inner anti-evaporation cover and the outer anti-wind assembly are arranged, so that the liquid between the liquid outlet tube and the capillary receiving tube and the liquid flowing into the liquid collecting container through the capillary receiving tube are not easily affected by an external gas flow to be evaporated.

In addition, the liquid sucked by the capillary receiving tube is stored in the capillary receiving tube. Since an inner diameter of the capillary receiving tube is extremely small, a contact area between a port of the capillary receiving tube and external air is also extremely small, so that the evaporation amount of the liquid is reduced significantly.

In addition, since the liquid receiving opening of the capillary receiving tube is horizontally aligned with the liquid outlet of the liquid outlet tube, a movement direction of the extruded liquid is perpendicular to a gravity direction, so that a convex height of the micro-convex liquid surface can be reduced, and the capillary receiving tube may be close to the liquid outlet as much as possible, thereby reducing the volume and the mass of the micro-convex liquid surface and reducing an influence of an evaporation amount of the micro-convex liquid surface and residual liquid droplets on a measuring result. At the same time, if an instantaneous micro liquid column is generated between the liquid outlet and the liquid receiving opening, since capillary force among a liquid receiving end of the capillary receiving tube, the micro liquid column, and the liquid outlet is in a horizontal direction and is orthogonal to a measuring direction of the weighing balance, an influence on the reading of the weighing balance is reduced.

Finally, since the packing assembly is arranged in the liquid collecting container, and the packing assembly has the low water absorption and can be gas-permeable, after the liquid is injected into the accommodating cavity in the liquid collecting container, air in the accommodating cavity can be discharged through the packing assembly, so that pressure in the accommodating cavity is consistent with environment pressure, to ensure that the liquid is sucked at a constant speed and is not affected by an injection amount of the liquid.

In conclusion, according to the present invention, the measuring device is improved in a plurality of aspects, so that a micro flow measuring error is reduced, and a technical effect of micro flow measuring precision is improved, thereby solving a problem that there is still a relatively large measuring error in micro flow measuring in the related art.

BRIEF DESCRIPTION OF THE DRAWINGS

The accompanying drawings constituting a part of the present invention are used to provide a further understanding of the present invention, so that other features, purposes and advantages of the present invention become more apparent. Schematic embodiment accompanying drawing of the present invention and descriptions thereof are used for explaining the present invention and are not intended to constitute an improper limitation to the present invention. In the accompanying drawings.

Figure 1:
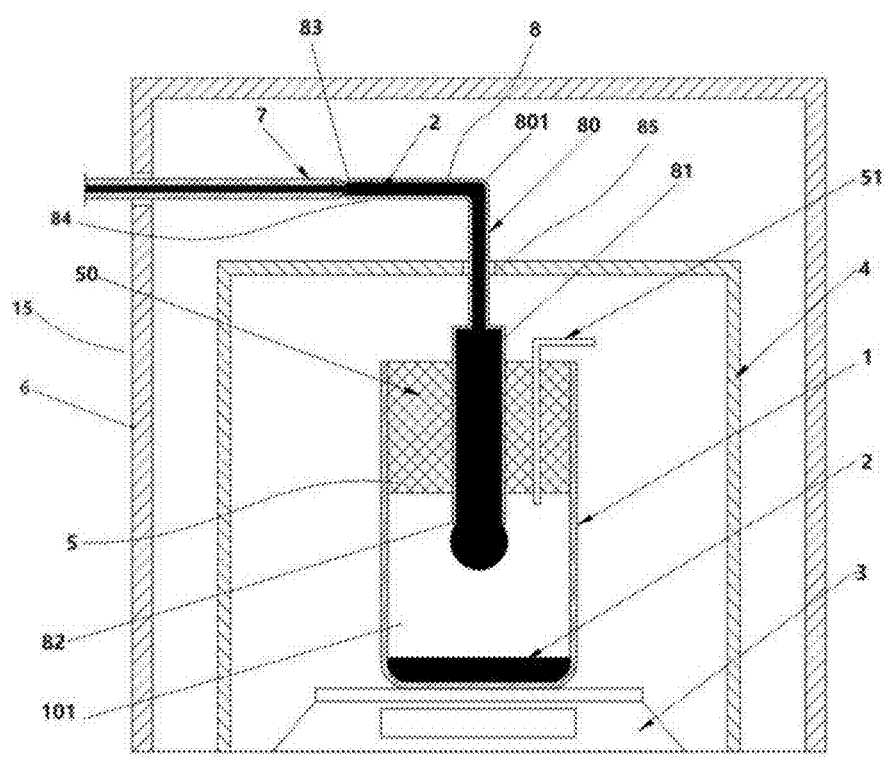
FIG. 1 is a schematic structural sectional view of a micro flow measuring device according to an embodiment of the present invention.

Reference numerals in the drawings: 1. liquid collecting container; 101. accommodating cavity; 2. measured medium; 3. weighing balance; 4. inner anti-evaporation cover; 5. packing assembly; 50. sealing packing; 51. gas discharging tube; 6. outer anti-wind cover; 7. liquid outlet tube; 70. liquid outlet; 8. capillary receiving tube; 80. first tube section; 801. corner section; 81. second tube section; 82. liquid discharging opening; 83. liquid receiving opening; 84. horizontal tube section; 85. vertical tube section; 9. first humidity adjusting structure; 10. outer anti-evaporation cover; 11. evaporation well; 13. second humidity adjusting structure; 131. accommodating groove; 132. vaporizable liquid; 14. mounting chamber; 15. outer anti-evaporation assembly.

DETAILED DESCRIPTION OF THE EMBODIMENTS

In order to enable a person skilled in the art to better understand the technical solutions of the present invention, the technical solutions in the embodiments of the present invention will be clearly and completely described below with reference to the accompanying drawings in the embodiments of the present invention. Apparently, the described embodiments are only some rather than all of the embodiments of the present invention. Based on the embodiments in the present invention, all other embodiments obtained by those of ordinary skill in the art without making creative efforts shall fall within the protection scope of the present invention.

It should be noted that, the terms "first", "second", and so on in the description and claims of the present invention and in the above accompanying drawings are intended to distinguish between similar objects but do not necessarily indicate a specific order or sequence. It should be understood that the data used in this way can be interchanged where appropriate, to facilitate describing the embodiments of the present invention herein.

In the present invention, the orientations or positional relationships indicated by the terms "above", "below", "in", and the like are in accordance with those shown in the accompanying drawings. These terms are mainly for better describing the present invention and the embodiments thereof rather than for indicating that the referred devices, elements, or components must have a particular orientation or be constructed or operated in a particular orientation.

Furthermore, in addition to being used for representing orientations or positional relationships, some of the above terms may also be used to represent other meanings, for example, the term "above" may also be used to represent a certain attachment relationship or connection relationship in some cases. Those of ordinary skill in the art can understand specific meanings of these terms in the present invention according to specific situations.

In addition, the terms "dispose", "provide", "connect", "fix", and the like should be understood in a broad sense. For example, "connect" may be a fixed connection, a detachable connection, or an integral structure; a mechanical connection or an electrical connection; and a direct connection or an indirect connection through an intermediate medium or a communication between two devices, elements, or components. Those of ordinary skill in the art can understand specific meanings of these terms in the present invention according to specific situations.

In addition, the term "a plurality of" refers to two or more.

It should be noted that the embodiments of the present invention and the features in the embodiments can be combined with each other in case of no conflict. The present invention will be described in detail below with reference to the accompanying drawings and the embodiments.

Figure 2:
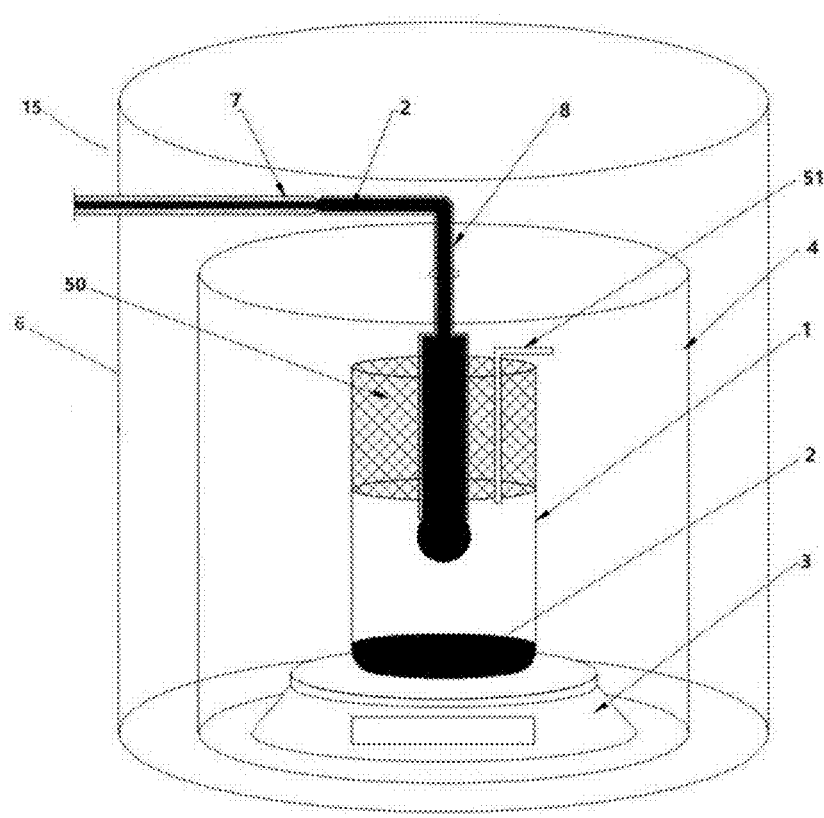
FIG. 2 is a schematic structural perspective view of a micro flow measuring device according to an embodiment of the present invention.
Figure 3:
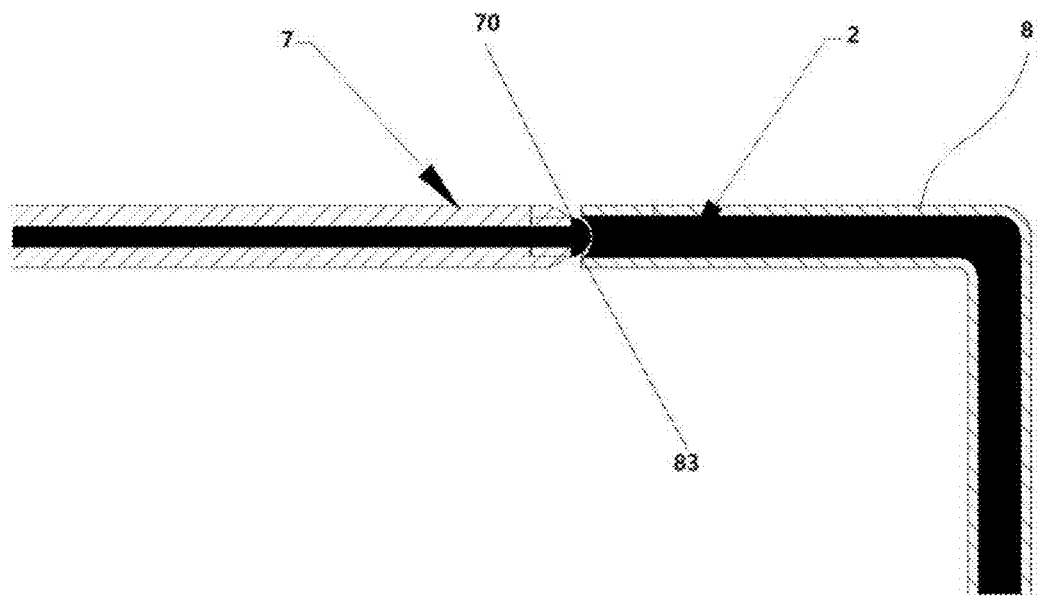
FIG. 3 is a schematic structural diagram of a liquid outlet tube and a capillary receiving tube according to an embodiment of the present invention.

To solve related technical problems, as shown in FIG. 1 to FIG. 3, an embodiment of the present invention provides a micro flow measuring device based on a mass method, and the measuring device includes:

an inner anti-evaporation cover 4;

an outer anti-evaporation assembly 15, where the outer anti-evaporation assembly 15 covers the inner anti-evaporation cover 4;

a weighing balance 3, disposed in the inner anti-evaporation cover 4;

a liquid collecting container 1, disposed in the inner anti-evaporation cover 4 and placed on the weighing balance 3;

a packing assembly 5, disposed in the liquid collecting container 1, where the packing assembly 5 is made of a material with low water absorption and can be gas-permeable, and an accommodating cavity 101 configured to accommodate to-be-measured liquid is formed between a lower end of the packing assembly 5 and a bottom portion of the liquid collecting container 1;

a capillary receiving tube 8, where the capillary receiving tube 8 is disposed in an L shape, an upper end and a lower end of the capillary receiving tube 8 are provided with a liquid receiving opening 83 and a liquid discharging opening 82 respectively, the lower end of the capillary receiving tube 8 passes through the packing assembly vertically and extends into the accommodating cavity 101, and the upper end of the capillary receiving tube 8 passes through the inner anti-evaporation cover 4 and is bent to be horizontal; and a liquid outlet tube 7, where the liquid outlet tube 7 includes a horizontal liquid outlet section, an end portion of the horizontal liquid outlet section is provided with a liquid outlet 70, the liquid outlet 70 of the liquid outlet tube 7 is horizontally aligned with and maintains a first distance with the liquid receiving opening 83 after passing through the outer anti-evaporation assembly 15, to enable liquid discharged by the liquid outlet 70 to be sucked into the liquid receiving opening 83 at intervals, and the liquid discharging opening 82 drips the liquid into the liquid collecting container 1 at intervals.

In the embodiment, a mounting process of the micro flow measuring device is as follows: the liquid collecting container 1 is placed on the weighing balance 3, and the packing assembly 5 is arranged in the liquid collecting container 1. Certainly, the packing assembly 5 may be arranged in the liquid collecting container 1 first, and then the liquid collecting container 1 with the packing assembly 5 is placed on the weighing balance 3. The packing assembly 5 is arranged in different manners according to different packing types. When the packing assembly 5 includes a foaming-type packing, the packing assembly 5 may be formed in the liquid collecting container 1 in a foaming manner. When the packing assembly 5 is an independent component, the packing assembly 5 may be mounted in the liquid collecting container 1 for use. To improve a liquid weighing capability of the liquid collecting container 1, a weight of the packing assembly 5 may be as small as possible, that is, the packing assembly 5 needs to be made of a light material. In the embodiment, the accommodating cavity 101 configured to accommodate the to-be-measured liquid is formed between the lower end of the packing assembly 5 and the bottom portion of the liquid collecting container 1. A certain amount of liquid, that is, a measured medium 2, can be accommodated by using the accommodating cavity 101, and a volume of the accommodating cavity 101 should be greater than a volume of liquid required for completing an entire measuring process.

In addition, after the packing assembly 5 is arranged in the liquid collecting container 1, the accommodating cavity 101 forms a relatively closed space, thereby reducing an influence of an external gas flow on an evaporation amount of the liquid in the accommodating cavity 101, and the accommodating cavity 101 is constrained in a proper range, which helps measurement.

To enable liquid in a liquid receiving tube to be injected into the accommodating cavity 101 smoothly, air in the accommodating cavity 101 needs to be discharged while injecting the liquid into the accommodating cavity 101, thereby maintaining balanced internal and external pressure, to enable the liquid to flow smoothly.

According to the present invention, the packing assembly 5 is disposed, to enable the accommodating cavity 101 in the liquid collecting container 1 to be in a relatively closed environment, and the to-be-measured liquid entering the accommodating cavity 101 is not easily affected by the external gas flow, thereby reducing an evaporation amount of the to-be-measured liquid. At the same time, the accommodating cavity 101 is constrained in a proper range through the packing assembly 5. Since the packing assembly 5 is gas-permeable, when the to-be-measured liquid flows into the accommodating cavity 101, gas in the accommodating cavity 101 can be discharged, to enable the to-be-measured liquid to flow into the accommodating cavity smoothly.

In the embodiment, since the inner anti-evaporation cover 4 and the outer anti-evaporation assembly 15 are disposed, to enable air of an internal space to flow, the inner anti-evaporation cover 4 and the outer anti-evaporation assembly 15 may be provided with gas discharging holes, or lower ends of the inner anti-evaporation cover 4 and the outer anti-evaporation assembly 15 are in unsealed contact with a bearing surface (for example, a table top).

After the liquid collecting container 1 is placed, the inner anti-evaporation cover 4 may cover the weighing balance 3 and the liquid collecting container 1. The liquid in the liquid collecting container 1 is not easily affected by a change in the external gas flow by disposing the inner anti-evaporation cover 4, so that the evaporation amount of the liquid in the liquid collecting container 1 can be reduced, thereby further reducing a measuring error. An overall size of the inner anti-evaporation cover 4 may be designed according to sizes of the weighing balance 3 and the liquid collecting container 1, which is not limited in the embodiment. An upper end of the inner anti-evaporation cover 4 may be provided with a first mounting hole, and the first mounting hole corresponds to a middle portion of the liquid collecting container 1 in an up-and-down direction and allows the capillary receiving tube 8 to pass through.

In addition, it should be noted that when the packing assembly 5 is formed in the liquid collecting container 1 by using the foaming manner, the capillary receiving tube 8 may be positioned to the middle portion of the liquid collecting container 1 first through a specific tool, and then the packing assembly 5 is formed between side walls of the capillary receiving tube 8 and the liquid collecting container 1.

In the embodiment, the capillary receiving tube 8 is disposed in the L shape, that is, the capillary receiving tube 8 includes a horizontal tube section 84 and a vertical tube section 85. The liquid receiving opening 83 and the liquid discharging opening 82 that are on the capillary receiving tube 8 are located on end portions of the horizontal tube section 84 and the vertical tube section 85 respectively. The vertical tube section 85 may extend into the packing assembly 5 after passing through the first mounting hole on the inner anti-evaporation cover 4 and then penetrate through the packing assembly 5, so that the liquid in the capillary receiving tube 8 can be injected into the accommodating cavity 101 of the liquid collecting container 1. The horizontal tube section 84 of the capillary receiving tube 8 is located above the inner anti-evaporation cover 4 and is matched with the liquid outlet tube 7, to suck liquid extruded from the liquid outlet tube 7 into the capillary receiving tube 8.

After the capillary receiving tube 8 is arranged, the outer anti-evaporation assembly 15 may cover an outer side of the inner anti-evaporation cover 4 and cover the capillary receiving tube 8. A side surface of the outer anti-evaporation assembly 15 may be provided with a second mounting hole, and at least a part of the liquid outlet tube 7 may pass through the second mounting hole along a horizontal direction to correspond to the liquid receiving opening 83 of the capillary receiving tube 8. Since the liquid flows out through the liquid outlet 70 of the liquid outlet tube 7 and is sucked into the capillary receiving tube 8 through the liquid receiving opening 83 in a liquid injection process, the outer anti-evaporation assembly 15 can reduce an influence of the change in the external gas flow on the liquid between the liquid outlet 70 and the liquid receiving opening 83 and reduce an evaporation amount of a part of the liquid, thereby reducing the measuring error.

Similarly, the liquid outlet tube 7 has a part that is horizontally aligned with a horizontal portion of the capillary receiving tube 8, and the liquid outlet 70 of the liquid outlet tube 7 is located an end portion of the part of the liquid outlet tube 7. In the embodiment, the liquid outlet 70 of the liquid outlet tube 7 is not in direct contact with the liquid receiving opening 83 of the capillary receiving tube 8, and there is a certain distance, that is, the first distance between the liquid outlet and the liquid receiving opening. A specific value of the first distance should meet that: the liquid extruded through the liquid outlet 70 can be in contact with the liquid receiving opening 83 after forming a micro-convex liquid surface of a certain size and can be sucked into the capillary receiving tube 8 through the liquid receiving opening 83. In addition, a continuous liquid column may not be formed between the liquid outlet 70 and the liquid receiving opening 83 after suction. In other words, the capillary receiving tube 8 can suck the liquid extruded from the liquid outlet 70 at intervals and drip the liquid into the liquid collecting container 1 through the liquid discharging opening 82 at intervals.

In the embodiment, a flow measuring method using the micro flow measuring device is that: liquid whose flow is measured is used as the measured medium 2 and is extruded from the liquid outlet 70 of the liquid outlet tube 7, to form the micro-convex liquid surface. After the liquid surface is in contact with the liquid receiving opening 83 of the capillary receiving tube 8, the liquid is quickly sucked, cut, and gradually accumulated into a vertical portion of the capillary receiving tube 8 due to capillarity. After a certain mass of liquid is accumulated in the vertical portion, the liquid is dripped into the liquid collecting container 1 from the liquid discharging opening 82 at a lower end of the vertical portion, and then a current mass of the liquid collecting container 1 may be obtained through the weighing balance 3, to obtain the mass of the sucked liquid, thereby obtain the flow of the liquid by using the mass method.

In the embodiment, first, the liquid outlet tube 7 and the capillary receiving tube 8 are horizontally aligned, so that a continuous liquid flow is converted into suction that is at equal time intervals, to provide stable reading time for the weighing balance 3, thereby improving repeatability and accuracy of flow measuring.

Then, the inner anti-evaporation cover 4 and the outer anti-evaporation assembly 15 are arranged, so that the liquid between the liquid outlet tube 7 and the capillary receiving tube 8 and the liquid flowing into the liquid collecting container 1 through the capillary receiving tube 8 are not easily affected by the external gas flow to be evaporated.

In addition, the liquid sucked by the capillary receiving tube 8 is stored in the capillary receiving tube 8. Since an inner diameter of the capillary receiving tube 8 is extremely small, a contact area between a port of the capillary receiving tube and external air is also extremely small, so that the evaporation amount of the liquid is reduced significantly.

In addition, since the liquid receiving opening 83 of the capillary receiving tube 8 is horizontally aligned with the liquid outlet 70 of the liquid outlet tube 7, a movement direction of the extruded liquid is perpendicular to a gravity direction, so that a convex height of the micro-convex liquid surface can be reduced, and the capillary receiving tube 8 may be close to the liquid outlet 70 as much as possible, thereby reducing the volume and the mass of the micro-convex liquid surface and reducing an influence of an evaporation amount of the micro-convex liquid surface and residual liquid droplets on a measuring result. At the same time, if an instantaneous micro liquid column is generated between the liquid outlet 70 and the liquid receiving opening 83, since capillary force among a liquid receiving end of the capillary receiving tube 8, the micro liquid column, and the liquid outlet 70 is in a horizontal direction and is orthogonal to a measuring direction of the weighing balance 3, an influence on the reading of the weighing balance 3 is reduced.

At the same time, since the liquid discharging opening 82 of the capillary receiving tube 8 drips the liquid into the liquid collecting container 1 at intervals, the continuous liquid column is not formed between the liquid discharging opening 82 and the liquid collecting container 1, so that there is no additional force between the capillary receiving tube 8 and the liquid collecting container 1, and the measuring error is not caused when the flow changes.

Finally, since the packing assembly 5 is arranged in the liquid collecting container 1, and the packing assembly 5 has the low water absorption and can be gas-permeable, after the liquid is injected into the accommodating cavity in the liquid collecting container 1, air in the accommodating cavity can be discharged through the packing assembly 5, so that pressure in the accommodating cavity is consistent with environment pressure, to ensure that the liquid is sucked at a constant speed and is not affected by an injection amount of the liquid.

In conclusion, according to the present invention, the measuring device is improved in a plurality of aspects, so that a micro flow measuring error is reduced, and a technical effect of micro flow measuring precision is improved, thereby solving a problem that there is still a relatively large measuring error in micro flow measuring in the related art.

In addition, it should be further noted that, to facilitate forming a certain micro-convex liquid on the end portion of the liquid outlet tube 7, in the embodiment, one end, close to the capillary receiving tube 8, on a horizontal liquid outlet section of the liquid outlet tube 7 is disposed in a tapered structure. An outer diameter of one end, close to the capillary receiving tube 8, on the tapered structure is equal to a diameter of the liquid receiving opening 83. The first distance is a distance between the end, close to the capillary receiving tube 8, on the tapered structure and an end portion of the liquid receiving opening 83.

To enable the capillary receiving tube 8 to suck the to-be-measured liquid at intervals, the first distance should meet a certain condition. When the first distance is too small, the continuous liquid column may form between the liquid outlet 70 of the liquid outlet tube 7 and the liquid receiving opening 83 of the capillary receiving tube 8. At this time, the capillary receiving tube 8 is in a process of continuous liquid feeding, causing that the liquid discharging opening 82 of the capillary receiving tube 8 is in continuous liquid dripping, and the weighing balance 3 lacks proper time for reading. When the first distance is too large, the micro-convex liquid surface extruded through the liquid outlet 70 may not be in contact with the liquid receiving opening 83 of the capillary receiving tube 8, causing that the micro-convex liquid surface cannot be sucked into the capillary receiving tube 8 normally.

Therefore, in the embodiment, as shown in FIG. 3, the first distance is less than an outer diameter of the liquid outlet 70 and is greater than a maximum distance required for forming the continuous liquid column between the liquid outlet 70 and the liquid receiving opening 83. Further, in a preferred implementation, the first distance is less than one-half of the outer diameter of the liquid outlet 70. In an implementation, the mass of a minimum micro-convex liquid droplet extruded through the liquid outlet 70 is 0.03 mg, and a convex degree of the liquid droplet may be determined according to liquid tension.

On the basis of disposing the capillary receiving tube 8 in the L shape, the capillary receiving tube is further improved in the embodiment. Specifically, since the inner diameter of the capillary receiving tube 8 is extremely small, a capacity of liquid that may be stored is extremely limited. If an accumulated volume of sucked liquid is greater than a capacity of the capillary tube, the liquid drips into the collecting container. Once the liquid drips, the liquid will be expanded into a flat thin layer, a surface area is increased significantly, and the evaporation amount is also increased sharply. Therefore, on the premise that capillarity of the capillary receiving tube 8 is not affected, to increase a liquid accommodating capability of the capillary receiving tube 8 and reduce the evaporation amount of the liquid, the capillary receiving tube 8 in the embodiment has a variable-diameter structure.

Specifically, as shown in FIG. 1 and FIG. 2, in the embodiment, the capillary receiving tube 8 includes a first tube section 80 and a second tube section 81 that are communicated with each other. The first tube section 80 includes the horizontal tube section 84, and the vertical tube section 85 includes the second tube section 81. An inner diameter of the second tube section 81 is greater than an inner diameter of the first tube section 80, the second tube section 81 passes through the packing assembly 5 vertically and extends into the accommodating cavity 101, and the liquid discharging opening 82 is located at a lower end of the second tube section 81. The first tube section 80 includes a horizontal section, and the liquid receiving opening 83 is located on an end portion of the horizontal section.

In the embodiment, the inner diameter of the first tube section 80 is relatively small, and the first tube section can suck the liquid and accommodate a certain mass of liquid under capillarity. The inner diameter of the second tube section 81 is relatively large, and the second tube section can significantly increase the liquid accommodating capability, reduce a dripping frequency of the liquid, and reduce the evaporation amount of the liquid. The first tube section 80 and the second tube section 81 are matched with each other, so that the liquid accommodating capability of the capillary receiving tube 8 can be increased while the capillary receiving tube 8 can smoothly suck the liquid, and the evaporation amount of the liquid can be reduced with a relatively small sectional area.

Further, since the capillary receiving tube 8 in the present invention is of the L shape, there are two structural forms after the capillary receiving tube is divided into the first tube section 80 and the second tube section 81. In a structural form, the first tube section 80 includes a part of the horizontal tube section 84, and the second tube section 81 includes a part of the horizontal tube section 84 and all of the vertical tube section 85. In another structural form, the first tube section 80 includes all of the horizontal tube section 84 and a part of the vertical tube section, and the second tube section 81 includes a remaining part of the vertical tube section 85. Since the liquid needs to first flow horizontally in the capillary receiving tube 8 and then flow vertically, to enable a flow process of the liquid to be smooth, preferably, the capillary receiving tube 8 in the embodiment is of a structural form that the first tube section 80 includes all of the horizontal tube section 84 and a part of the vertical tube section 85, and the second tube section 81 only includes the remaining part of the vertical tube section 85.

Since the liquid is converted from flowing horizontally to flowing vertically in the capillary receiving tube 8 after being sucked, liquid in the tube in a vertical direction moves downward due to gravity, and a movement direction of liquid in a horizontal direction is perpendicular to a gravity direction, the liquid in the tube in the horizontal direction must be continuous with the liquid in the vertical direction at a corner of the capillary receiving tube 8, to implement continuous liquid suction. Therefore, the corner of the capillary receiving tube 8 needs to be as smooth as possible without generating partial resistance that results in liquid continuity interruption or gas accumulation. If a radius of the corner is too large, a size of the capillary receiving tube 8 extending out of the liquid collecting container 1 may be too long, thereby resulting in unbalanced loading of the balance. Therefore, the corner is further improved in the embodiment.

Specifically, the first tube section 80 in the embodiment further includes a corner section 801. The corner section is configured to connect the horizontal tube section 84 and the vertical tube section 85. An inner surface of the corner section 801 is disposed in an arc-shaped surface, and a corner radius of the corner section 801 is from 1D to 2D, where D is an outer diameter of the first tube section 80. In addition, to ensure that the liquid is smoothly sucked, the liquid receiving opening 83 opposite to the liquid outlet tube 7 should be of a cylindrical shape, so that the capillary force does not change with a change in a tube diameter. Further, the first tube section 80 and the second tube section 81 are both disposed in the cylindrical shape.

Figure 4:
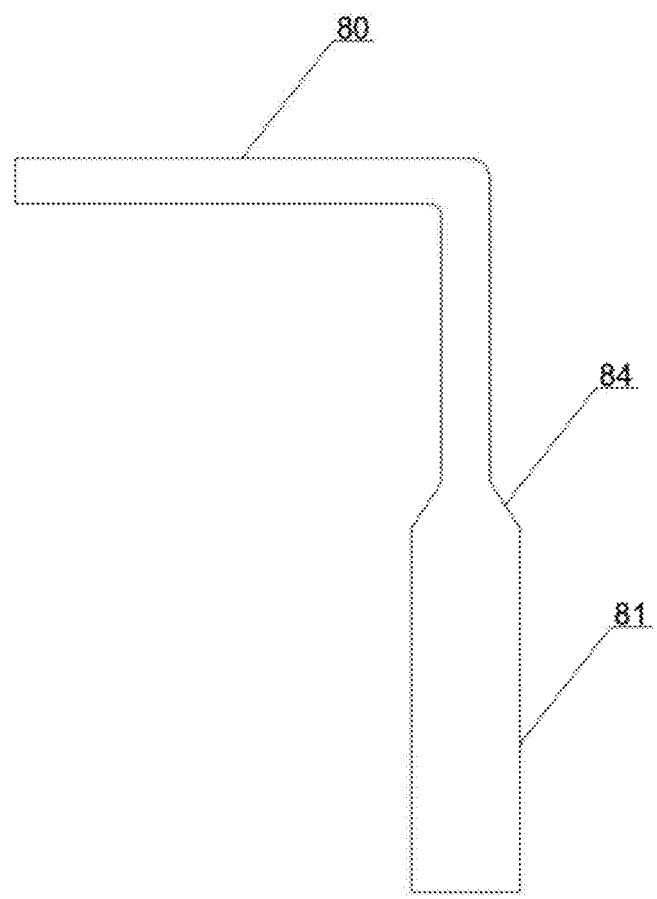
FIG. 4 is a schematic structural diagram of a capillary receiving tube according to an embodiment of the present invention.

Since the inner diameter of the second tube section 81 is greater than the inner diameter of the first tube section 80, to reduce an influence of a change in the inner diameter of the tube section on the liquid in the first tube section 80 after entering the second tube section 81, as shown in FIG. 4, in the embodiment, the first tube section 80 is connected to the second tube section 81 through a transition section 84. The transition section 84 is disposed in a tapered shape. A small-diameter end of the transition section 84 is connected to and smoothly transits to the first tube section 80, and a large-diameter end of the transition section 84 is connected to and smoothly transits to the second tube section 81, so that the liquid can fully infiltrate an inner tube wall and gradually exhaust the air after entering the transition section 84. Therefore, the liquid can flow in the transition section 84 and the second tube section 81 smoothly. In an implementation of the transition section 84, an angle between a generatrix of the transition section 84 and an axis of the transition section 84 is from 10° to 15°. A ratio of the inner diameter of the second tube section 81 to the inner diameter of the first tube section 80 is (1.5-3):1.

A joint between the small-diameter end of the transition section 84 and the first tube section 80 may be an arc-shape chamfer, and a joint between the large-diameter end of the transition section 84 and the second tube section 81 may also be an arc-shaped chamfer.

Since the packing assembly 5 needs to have functions of low water absorption and gas permeation in the present invention, in an implementation of the packing assembly 5, the packing assembly 5 is made of a porous material with low water absorption. A micro pore can be used to discharge the air after the liquid is injected into the accommodating cavity 101, to ensure balanced internal and external pressure. For example, the packing assembly may be made of a microporous high polymer material such as polyamide, polyethylene, and polypropylene.

In another implementation of the packing assembly 5, as shown in FIG. 1 and FIG. 2, the packing assembly 5 includes a sealing packing 50 and a gas discharging tube 51. The sealing packing 50 is made of a material with low water absorption, for example, the polyamide, the polyethylene, the polypropylene, and other high polymer materials. In the embodiment, the sealing packing 50 does not have gas-permeable performance. A gas-permeable requirement of the packing assembly 5 is implemented through the gas discharging tube 51, and therefore, the gas discharging tube 51 penetrates through the sealing packing 50. After the liquid is injected into the accommodating cavity 101, and the air in the accommodating cavity 101 can be discharged from the gas discharging tube 51, thereby maintaining balanced internal and external pressure.

In the embodiment, the sealing packing 50 is made of a light foaming material with low water absorption and good elasticity, and an inner diameter of the gas discharging tube 51 is the same as an inner diameter of the liquid outlet tube 7. Weights of the sealing packing 50 and the gas discharging tube 51 need to be as small as possible, to improve liquid weighing capability of the liquid collecting container 1. After the sealing packing 50 is formed between inner walls of the capillary receiving tube 8 and the liquid collecting container 1 in a foaming manner, a value of the inner diameter of the liquid outlet tube 7 is obtained according to a minimum measured flow, a gas discharging tube 51 with the same inner diameter is selected as a standard gas discharging tube 51, and the gas discharging tube 51 penetrates through the sealing packing 50 to implement constant speed "liquid in and gas out". Finally, for other measured flows, an integer quantity of standard gas discharging tubes 51 penetrate through the sealing packing 50 correspondingly, to implement balanced pressure under different flows.

In another implementation, the sealing packing 50 may be a preformed component. During prefabrication, at least two through holes penetrating axially may be formed on the sealing packing 50. The second tube section 81 of the capillary receiving tube 8 may pass through and be closely matched with one through hole that is used as a penetrating hole, and the gas discharging tube 51 may pass through and be closely matched with the other through hole that is used as a mounting hole. An outer diameter of the sealing packing 50 is matched with an inner diameter of the liquid collecting container 1, so that the sealing packing 50 can be stuffed in and fixed to the liquid collecting container 1 under the elastic action of the sealing packing 50.

In a preferred implementation of the gas discharging tube 51, since the gas discharging tube 51 is configured to discharge the gas in the liquid collecting container 1 after the liquid enters the liquid collecting container 1, when the inner diameter of the gas discharging tube 51 is the same as the inner diameter of the liquid outlet tube 7, balanced internal and external pressure of the liquid collecting container 1 can be implemented. However, considering that viscosity of the gas is less than viscosity of the liquid, a discharging rate of the gas will be greater than a feeding rate of the liquid, and the inner diameter of the gas discharging tube 51 also affects the evaporation amount of the liquid in the liquid collecting container 1. Therefore, in the implementation, the inner diameter of the gas discharging tube 51 is disposed to be less than the inner diameter of the liquid outlet tube 7, so that the evaporation amount of the liquid can be further reduced when constant speed "liquid in and gas out" can be implemented, thereby improving measuring precision.

In some environments, a plurality of gas discharging tubes 51 need to be arranged, and therefore, a plurality of mounting holes penetrating axially may be preformed on the sealing packing 50. When only one gas discharging tube 51 is needed, the gas discharging tube 51 may be inserted into one mounting hole only, the other mounting holes are blocked through sealing plugs, to prevent the liquid from evaporating through the mounting hole. When the plurality of gas discharging tubes 51 are needed, corresponding sealing plugs are detached according to a quantity of the gas discharging tubes 51, to open corresponding mounting holes, and the plurality of gas discharging tubes 51 are inserted into the mounting holes one by one.

To facilitate determining a size of a space of the accommodating cavity 101, a lower end surface of the sealing plug is flush with a lower end surface of the sealing packing 50 preferably, so that a size of a space in the mounting hole in which the gas discharging tube 51 is not mounted does not need to be considered when the size of the space is determined, and the sealing plug is made of a material with low water absorption.

To facilitate discharging the gas in the accommodating cavity 101, in the embodiment, a lower end surface of the gas discharging tube 51 is flush with the lower end surface of the sealing packing 50 or is lower than the lower end surface of the sealing packing 50.

In an implementation of the gas discharging tube 51, the gas discharging tube 51 is disposed in an L shape, a vertical section of the gas discharging tube 51 is disposed in the mounting hole, and a horizontal section of the gas discharging tube 51 is located above the sealing packing 50.

In the liquid collecting container 1, the liquid discharging opening 82 of the capillary receiving tube 8 should not be in contact with a liquid surface that has been collected in the liquid collecting container 1. In this way, the advantages are as follows: first, influences of surface tension, buoyancy force, pressure intensity of the liquid, and other force caused by inserting the liquid discharging opening 82 into the liquid surface on flowing of the liquid in the capillary receiving tube 8, and it is ensured that a liquid outlet flow is stable and does not change with the increasing of the liquid surface in the liquid collecting container 1.

In a traditional manner of inserting the liquid discharging opening 82 into the liquid surface, a certain amount of liquid needs to be pre-stored in the liquid collecting container 1 to cover the liquid discharging opening 82. In this way, an effective weighing range is reduced, and a balance with a larger weighing value is used, thereby resulting in a certain weighing error correspondingly and limiting overall measuring precision. However, after the liquid discharging opening 82 of the capillary receiving tube 8 is controlled to not be in contact with the liquid surface that has been collected in the liquid collecting container 1, the liquid does not need to be pre-stored in the liquid collecting container 1, the effective weighing range is at least 70% of the balance, and a balance with a smaller weighing value may be selected, so that a minimum weighing value is further improved, and the overall measuring precision is improved significantly.

To implement the above purpose, a length of the liquid discharging opening 82 extending out of a lower end of the sealing packing 50 needs to be determined according to a capacity of to-be-collected liquid in the liquid collecting container 1. Specifically, a distance between the liquid discharging opening 82 and an inner bottom surface of the liquid collecting container 1 is greater than a liquid height in the accommodating cavity 101 in a measuring process.

Figure 5:
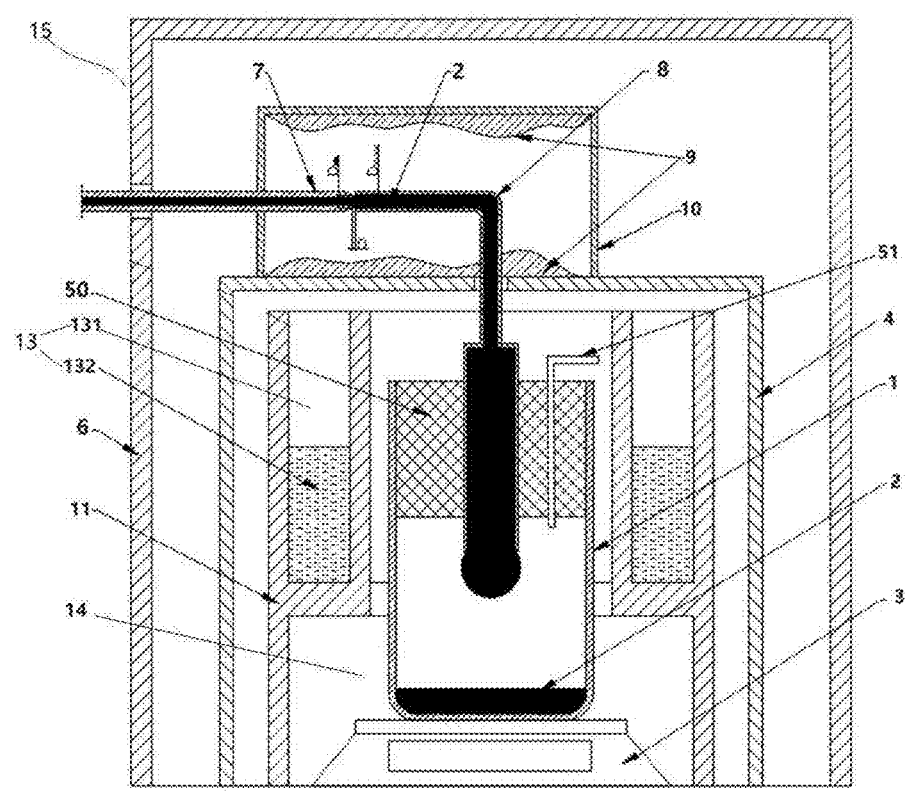
FIG. 5 is a schematic structural sectional view of a micro flow measuring device according to an embodiment of the present invention.

To further reduce an evaporation amount of the to-be-measured liquid, as shown in FIG. 5, the micro flow measuring device in the embodiment further includes an evaporation well 11. The evaporation well 11 is disposed in the inner anti-evaporation cover 4, an inner side of the evaporation well 11 is provided with a mounting chamber 14 penetrating axially, the mounting chamber 14 is sleeved on outer sides of the liquid collecting container 1 and the weighing balance 3, and there is a radial gap between the mounting chamber and the liquid collecting container 1 and the weighing balance 3. A second humidity adjusting structure 13 is disposed on the evaporation well, and the second humidity adjusting structure 13 is configured to increase humidity in the mounting chamber. In an implementation of the second humidity adjusting structure 13, the second humidity adjusting structure 13 includes an accommodating groove provided at an upper end of the evaporation well, and the accommodating groove accommodates vaporizable liquid.

Specifically, it should be noted that in the embodiment, the evaporation well 11 is arranged on an inner side of the inner anti-evaporation cover 4 additionally. The evaporation well 11 is sleeved on the weighing balance 3 and the liquid collecting container 1 through the mounting chamber 14. The evaporation well 11 maintains the gap with the weighing balance 3 and the liquid collecting container 1, to enable the evaporation well to not be in contact with the weighing balance and the liquid collecting container, so that a weight of the evaporation well 11 does not affect the weighing balance 3. In the embodiment, the mounting chamber 14 is a chamber penetrating axially, the weighing balance 3 is located on a lower portion of the mounting chamber 14, and the capillary receiving tube 8 can enter the liquid collecting container 1 through an upper portion of the mounting chamber 14.

To reduce the evaporation amount of the liquid in the liquid collecting container 1, humidity of gas in the inner anti-evaporation cover 4 needs to be improved. Therefore, in the embodiment, the upper end of the evaporation well 11 is provided with the accommodating groove 131, and the vaporizable liquid 132 is filled in the accommodating groove 131. The liquid in the accommodating groove 131 is evaporated to enable the humidity in the inner anti-evaporation cover 4 to reach saturation and remain constant, thereby reducing the evaporation amount of the liquid in the liquid collecting container 1 to a maximum extent and further improving the measuring precision.

In an embodiment of the accommodating groove 131, the accommodating groove 131 may be disposed as an annular groove provided along a circumference of the evaporation well 11, and the annular groove is located on an outer side of the mounting chamber 14.

Based on the above implementations, to further reduce the evaporation amount of the liquid, as shown in FIG. 5, the outer anti-evaporation assembly 15 in the embodiment includes an outer anti-wind cover 6 and an outer anti-evaporation cover 10. The outer anti-evaporation cover 10 is disposed on a top portion of the inner anti-evaporation cover 4, and the outer anti-wind cover 6 covers outer sides of the outer anti-evaporation cover 10 and the inner anti-evaporation cover 4. The upper end of the capillary receiving tube 8 extends into the outer anti-evaporation cover 10, and the liquid outlet 70 of the liquid outlet tube 7 is horizontally aligned with the liquid receiving opening 83 after passing through the outer anti-wind cover 6 and the outer anti-evaporation cover 10 in sequence. A first humidity adjusting structure 9 is disposed in the outer anti-evaporation cover 10, and the first humidity adjusting structure 9 is configured to increase humidity in the outer anti-evaporation cover 10. In an implementation of the first humidity adjusting structure 9, the first humidity adjusting structure 9 includes a moist water absorbing strip embedded in the outer anti-evaporation cover 10.

Specifically, in the embodiment, the outer anti-evaporation cover 10 is disposed on the top portion of the inner anti-evaporation cover 4 and is located on an inner side of the outer anti-wind cover 6. The outer anti-evaporation cover 10 covers a part, extending out of the inner anti-evaporation cover 4, on the capillary receiving tube 8, that is, the outer anti-evaporation cover at least covers the horizontal tube section 84 of the capillary receiving tube 8. The liquid outlet 70 of the liquid outlet tube 7 passes through the outer anti-evaporation cover 10, that is, the horizontal liquid outlet section is horizontally aligned with the horizontal tube section 84 after passing through the outer anti-evaporation cover 10. The moist water absorbing strip is disposed in the outer anti-evaporation cover 10.

Specifically, since the liquid outlet 70 of the liquid outlet tube 7 is not directly docked with the liquid receiving opening 83 of the capillary receiving tube 8, and there is a certain distance between the liquid outlet and the liquid receiving opening, to-be-measured liquid between the liquid outlet 70 and the liquid receiving opening 83 is in contact with external air, resulting in a certain evaporation. Therefore, in the embodiment, the outer anti-evaporation cover 10 is arranged on the top portion of the inner anti-evaporation cover 4. The outer anti-evaporation cover 10 covers the liquid outlet 70 and the liquid receiving opening 83, and the moist water absorbing strip is arranged in the outer anti-evaporation cover 10. Liquid contained in the water absorbing strip can enable air humidity in the outer anti-evaporation cover 10 to reach a stable humidity saturation state, so that humidity of air near the liquid outlet 70 and the liquid receiving opening 83 is saturated, thereby reducing the evaporation amount of the liquid in a process of being sucked into the capillary receiving tube 8 through the liquid receiving opening 83 and further improving the measuring precision.

Further, in the embodiment, two circles of water absorbing strips are disposed, and the two circles of water absorbing strips are embedded on an inner top surface of the outer anti-evaporation cover 10 and an outer top surface of the inner anti-evaporation cover 4.

According to another aspect of the present invention, a micro flow measuring method is provided, adopts the above micro flow measuring device, and includes the following steps:

extruding liquid whose flow is measured from the liquid outlet 70 of the liquid outlet tube 7, to form a micro-convex liquid surface;

sucking the liquid extruded by the liquid outlet 70 at an interval of $T_1$ time by using the liquid receiving opening 83 of the capillary receiving tube 8;

reading a reading of the weighing balance 3 within each interval of $T_1$ time after the liquid is sucked by the liquid receiving opening 83 of the capillary receiving tube 8 for the first time; and determining the flow of the liquid based on the reading of the weighing balance 3 within each $T_1$ time.

Specifically, in the embodiment, the liquid whose flow is measured is extruded from the liquid outlet 70 of the liquid outlet tube 7, to form the micro-convex liquid surface. After the liquid surface is in contact with the liquid receiving opening 83 of the capillary receiving tube 8, the liquid is quickly sucked, cut, and gradually accumulated into a vertical portion of the capillary receiving tube 8 due to capillarity. After a certain mass of liquid is accumulated in the vertical portion, the liquid is dripped into the liquid collecting container 1 from the liquid discharging opening 82 at a lower end of the vertical portion. Since the capillary receiving tube 8 is integrally formed with the liquid collecting container 1 through the sealing packing, after the liquid receiving opening 83 of the capillary receiving tube 8 sucks the liquid, the mass of the liquid is transferred from the liquid outlet 70 of the liquid outlet tube 7 to the liquid collecting container 1, that is, a weight of the sucked liquid is obtained. Therefore, there is no need to wait for the liquid to drip into the liquid collecting container 1 from the liquid discharging opening 82 of the capillary receiving tube 8, and the flow of the liquid may be determined based on the reading of the weighing balance 3 within each $T_1$ time at this time.

Certainly, in the embodiment of the present invention, a specific reading moment obtained after the liquid is sucked by the liquid receiving opening 83 of the capillary receiving tube 8 for the first time is not specially limited. In some implementations, the liquid may be accumulated in the capillary receiving tube 8 until the liquid drips into the liquid collecting container 1 from the liquid discharging opening 82, and then a current mass of the liquid collecting container 1 may be obtained through the weighing balance 3, to obtain the mass of the sucked liquid, thereby obtain the flow of the liquid by using the mass method. When the mass method is based, a reading of each $T_1$ may be accumulated to calculate the flow of the liquid.

Since there is the distance between the liquid outlet 70 of the liquid outlet tube 7 and the liquid receiving opening 83 of the capillary receiving tube 8 in the present invention, the liquid extruded by the liquid outlet 70 needs to be sucked by the liquid receiving opening 83 after forming a certain micro-convex liquid surface. In the embodiment, the $T_1$ time is a sum of time required for forming the micro-convex liquid surface and time required for the liquid receiving opening 83 to suck this part of liquid. Therefore, a specific value of $T_1$ needs to be designed according to a property of liquid whose flow is to be measured, a structure of the liquid outlet tube 7, and a structure of the capillary receiving tube 8, which is not limited herein in the embodiment.

After the micro flow measuring device includes the evaporation well 11 and the outer anti-evaporation cover 10, when flow measuring is performed, air humidity in the inner anti-evaporation cover 4 and air humidity in the outer anti-evaporation cover 10 are first controlled to reach a set value, and then the to-be-measured liquid may be injected into the liquid outlet tube 7 to perform the above flow measuring. In a measuring process, the air humidity in the inner anti-evaporation cover 4 and the humidity in the outer anti-evaporation cover 10 may be monitored in real time. At the same time, the air humidity is controlled, and the evaporation amount of the liquid is also reduced in the measuring process.

The foregoing descriptions are merely illustrative of the preferred embodiments of the present invention and are not intended to limit the present invention, and for a person skilled in the art, the present invention may have various changes and modifications. Any modifications, equivalent replacements, improvements, and the like made within the spirit and principle of the present invention shall fall within the protection scope of the present invention.

What is claimed is:

1. A micro flow measuring device based on a mass method, comprising:
    an inner anti-evaporation cover;
    an outer anti-evaporation assembly, wherein the outer anti-evaporation assembly covers the inner anti-evaporation cover;
    a weighing balance, disposed in the inner anti-evaporation cover;
    a liquid collecting container, disposed in the inner anti-evaporation cover and placed on the weighing balance;
    a packing assembly, disposed in the liquid collecting container, wherein the packing assembly is made of a material with low water absorption and is gas-permeable, and an accommodating cavity configured to accommodate to-be-measured liquid is formed between a lower end of the packing assembly and a bottom portion of the liquid collecting container;
    a capillary receiving tube, wherein the capillary receiving tube is disposed in an L shape, an upper end and a lower end of the capillary receiving tube are provided with a liquid receiving opening and a liquid discharging opening respectively, the lower end of the capillary receiving tube passes through the packing assembly vertically and extends into the accommodating cavity, and the upper end of the capillary receiving tube passes through the inner anti-evaporation cover and is bent to be horizontal; and
    a liquid outlet tube, wherein the liquid outlet tube comprises a horizontal liquid outlet section, an end portion of the horizontal liquid outlet section is provided with a liquid outlet, the liquid outlet of the liquid outlet tube is horizontally aligned with and maintains a first distance with the liquid receiving opening after passing through the outer anti-evaporation assembly, to enable liquid discharged by the liquid outlet to be sucked into the liquid receiving opening at intervals, and the liquid discharging opening drips the liquid into the liquid collecting container at intervals; and
    the first distance is less than an outer diameter of the liquid outlet and is greater than a maximum distance required for forming a continuous liquid column between the liquid outlet and the liquid receiving opening.

2. The micro flow measuring device based on a mass method according to claim 1, wherein the first distance is less than one-half of the outer diameter of the liquid outlet.

3. The micro flow measuring device based on a mass method according to claim 1, wherein one end, close to the capillary receiving tube, on the horizontal liquid outlet section of the liquid outlet tube is provided with a tapered structure, and an outer diameter of one end, close to the capillary receiving tube, on the tapered structure is equal to an inner diameter of the liquid receiving opening; and
    the first distance is a distance between the end, close to the capillary receiving tube, on the tapered structure and an end portion of the liquid receiving opening.

4. The micro flow measuring device based on a mass method according to claim 1, wherein the capillary receiving tube comprises a first tube section and a second tube section that are communicated with each other, an inner diameter of the second tube section is greater than an inner diameter of the first tube section, the second tube section passes through the packing assembly vertically and extends into the accommodating cavity, and the liquid discharging opening is located at a lower end of the second tube section; and the first tube section comprises a horizontal section, and the liquid receiving opening is located on an end portion of the horizontal section.

5. The micro flow measuring device based on a mass method according to claim 4, wherein the first tube section is connected to the second tube section through a transition section, the transition section is disposed in a tapered shape, a small-diameter end of the transition section is connected to the first tube section, and a large-diameter end of the transition section is connected to the second tube section.

6. The micro flow measuring device based on a mass method according to claim 1, wherein the packing assembly is made of one or more microporous high polymer materials of polyamide, polyethylene, and polypropylene.

7. The micro flow measuring device based on a mass method according to claim 1, wherein the packing assembly comprises a sealing packing and a gas discharging tube, the sealing packing is made of the material with the low water absorption, and the gas discharging tube penetrates through the sealing packing.

8. The micro flow measuring device based on a mass method according to claim 7, wherein an inner diameter of the gas discharging tube is less than an inner diameter of the liquid outlet tube.

9. The micro flow measuring device based on a mass method according to claim 7, wherein the sealing packing is elastic, and the sealing packing is stuffed in and fixed to the liquid collecting container; and the sealing packing is provided with a penetrating hole and a mounting hole, the capillary receiving tube passes through and is closely matched with the penetrating hole, and the gas discharging tube passes through and is closely matched with the mounting hole.

10. The micro flow measuring device based on a mass method according to claim 9, wherein a plurality of mounting holes are provided, at least one mounting hole is provided with the gas discharging tube, and other mounting holes are provided with a detachable sealing plug respectively; and the sealing plug is made of the material with the low water absorption, and a lower end surface of the sealing plug is flush with a lower end surface of the sealing packing.

11. The micro flow measuring device based on a mass method according to claim 1, wherein a distance between the liquid discharging opening and an inner bottom surface of the liquid collecting container is greater than a liquid height in the accommodating cavity in a measuring process.

12. The micro flow measuring device based on a mass method according to claim 1, wherein the outer anti-evaporation assembly comprises an outer anti-wind cover and an outer anti-evaporation cover, the outer anti-evaporation cover is disposed on a top portion of the inner anti-evaporation cover, and the outer anti-wind cover covers outer sides of the outer anti-evaporation cover and the inner anti-evaporation cover;

the upper end of the capillary receiving tube extends into the outer anti-evaporation cover, and the liquid outlet of the liquid outlet tube is horizontally aligned with the liquid receiving opening after passing through the outer anti-wind cover and the outer anti-evaporation cover in sequence;

a first humidity adjusting structure is disposed in the outer anti-evaporation cover, and the first humidity adjusting structure increases humidity in the outer anti-evaporation cover; and the first humidity adjusting structure comprises a moist water absorbing strip embedded in the outer anti-evaporation cover.

13. The micro flow measuring device based on a mass method according to claim 12, wherein the micro flow measuring device further comprises an evaporation well, the evaporation well is disposed in the inner anti-evaporation cover, an inner side of the evaporation well is provided with a mounting chamber penetrating axially, the mounting chamber is sleeved on outer sides of the liquid collecting container and the weighing balance, and there is a radial gap between the mounting chamber and the liquid collecting container and the weighing balance; and a second humidity adjusting structure is disposed on the evaporation well, and the second humidity adjusting structure is configured to increase humidity in the mounting chamber.

14. The micro flow measuring device based on a mass method according to claim 13, wherein the second humidity adjusting structure comprises an accommodating groove provided at an upper end of the evaporation well, and the accommodating groove accommodates vaporizable liquid.

15. A micro flow measuring method, adopting the micro flow measuring device according to claim 1, wherein the micro flow measuring method comprises the following steps:

extruding liquid whose flow is measured from the liquid outlet of the liquid outlet tube, to form a micro-convex liquid surface;

sucking the liquid extruded by the liquid outlet at an interval of T1 time by using the liquid receiving opening of the capillary receiving tube;

reading a reading of the weighing balance within each interval of T1 time after the liquid is sucked by the liquid receiving opening of the capillary receiving tube for the first time; and determining the flow of the liquid based on the reading of the weighing balance within each T1 time.

\* \* \* \* \*